(12) United States Patent
Burke

(10) Patent No.: US 7,998,517 B2
(45) Date of Patent: Aug. 16, 2011

(54) MEAT AGING PROCESS

(76) Inventor: David Burke, Fort Lee, NJ (US)

( * ) Notice: Subject to any disclaimer, the term of this patent is extended or adjusted under 35 U.S.C. 154(b) by 328 days.

(21) Appl. No.: 12/478,014

(22) Filed: Jun. 4, 2009

(65) Prior Publication Data

US 2010/0310736 A1 Dec. 9, 2010

(51) Int. Cl.
*A23L 3/00* (2006.01)
(52) U.S. Cl. .......................... 426/524; 426/232; 426/418
(58) Field of Classification Search .................. 426/232, 426/524, 248, 418, 641–647, 444; 99/471, 99/473, 483, 467–470, 472, 474–481; 62/157, 62/408, 440
See application file for complete search history.

(56) References Cited

U.S. PATENT DOCUMENTS

| | | | | | |
|---|---|---|---|---|---|
| 2,047,454 | A | * | 7/1936 | Anderson et al. | 312/213 |
| 2,169,081 | A | * | 8/1939 | James | 426/55 |
| 2,315,285 | A | * | 3/1943 | Dennington | 62/264 |
| 2,419,119 | A | * | 4/1947 | Christensen | 165/230 |
| 2,494,024 | A | * | 1/1950 | Williams | 426/524 |
| 2,560,057 | A | * | 7/1951 | Williams | 62/271 |
| 2,705,678 | A | * | 4/1955 | Morrison | 426/524 |
| 2,709,985 | A | * | 6/1955 | Clauson | 119/464 |
| 2,816,836 | A | * | 12/1957 | Williams | 426/56 |
| 2,817,957 | A | * | 12/1957 | Rowland | 62/408 |
| 2,832,278 | A | * | 4/1958 | Taranik | 99/475 |
| 2,834,188 | A | * | 5/1958 | Bradford | 62/91 |
| 2,988,452 | A | * | 6/1961 | Cameron | 426/55 |
| 3,056,679 | A | * | 10/1962 | Williams | 426/56 |
| 3,058,831 | A | | 10/1962 | Lorant | |
| 3,147,123 | A | * | 9/1964 | Komarik | 426/56 |
| 3,377,941 | A | * | 4/1968 | Jaremus | 99/468 |
| 3,552,297 | A | * | 1/1971 | Williams | 99/468 |
| 3,557,567 | A | * | 1/1971 | Brennan | 426/393 |
| 3,595,681 | A | | 7/1971 | Kaplow et al. | |
| 3,903,788 | A | * | 9/1975 | Freeland et al. | 99/475 |
| 4,336,788 | A | * | 6/1982 | Stein | 126/8 |
| 4,350,711 | A | | 9/1982 | Kahn et al. | |
| 4,484,517 | A | * | 11/1984 | Amann | 99/474 |

(Continued)

FOREIGN PATENT DOCUMENTS

WO WO 03084453 A1 * 10/2003

OTHER PUBLICATIONS http://www.victorchurchill.com/wp-content/uploads/CutsAboveTheRest.pdf. 1 page; Sep. 25, 2010.*

(Continued)

*Primary Examiner* — Drew E Becker
*Assistant Examiner* — Steven Leff
(74) *Attorney, Agent, or Firm* — Notaro, Michalos & Zaccaria P.C.

(57) ABSTRACT

A process for dry aging meat uses an enclosed, atmosphere controlled room with forced circulation, containing a stainless steel salt rack with a salt brick stack covering one wall. Each brick has a narrow width compared to its length for increased surface area and the salt rack is spaced from the wall for circulation around the bricks. A plurality of unwrapped and uncovered meat piece are loaded onto a meat rack in the room, spaced far from the salt rack and on a timed cycle of days that is a fraction of the total number of days for aging, the meat pieces are moved ever closer to the salt rack until finally, after the expiration of the total selected number of days for the dry aging, they are removed from the aging room for use.

17 Claims, 3 Drawing Sheets

U.S. PATENT DOCUMENTS

| | | | | |
|---|---|---|---|---|
| 5,441,098 A | * | 8/1995 | Kristensen | 165/206 |
| 5,939,112 A | | 8/1999 | Katayama et al. | |
| 6,054,161 A | * | 4/2000 | Palmer | 426/312 |
| 6,447,827 B1 | * | 9/2002 | Andersen | 426/231 |

OTHER PUBLICATIONS http://www.victorchurchill.com/wp-content/uploads/2009/09/Good-Living-Victor-Churchill-150909.pdf; 2 pages; Sep. 15, 2009.*

* cited by examiner

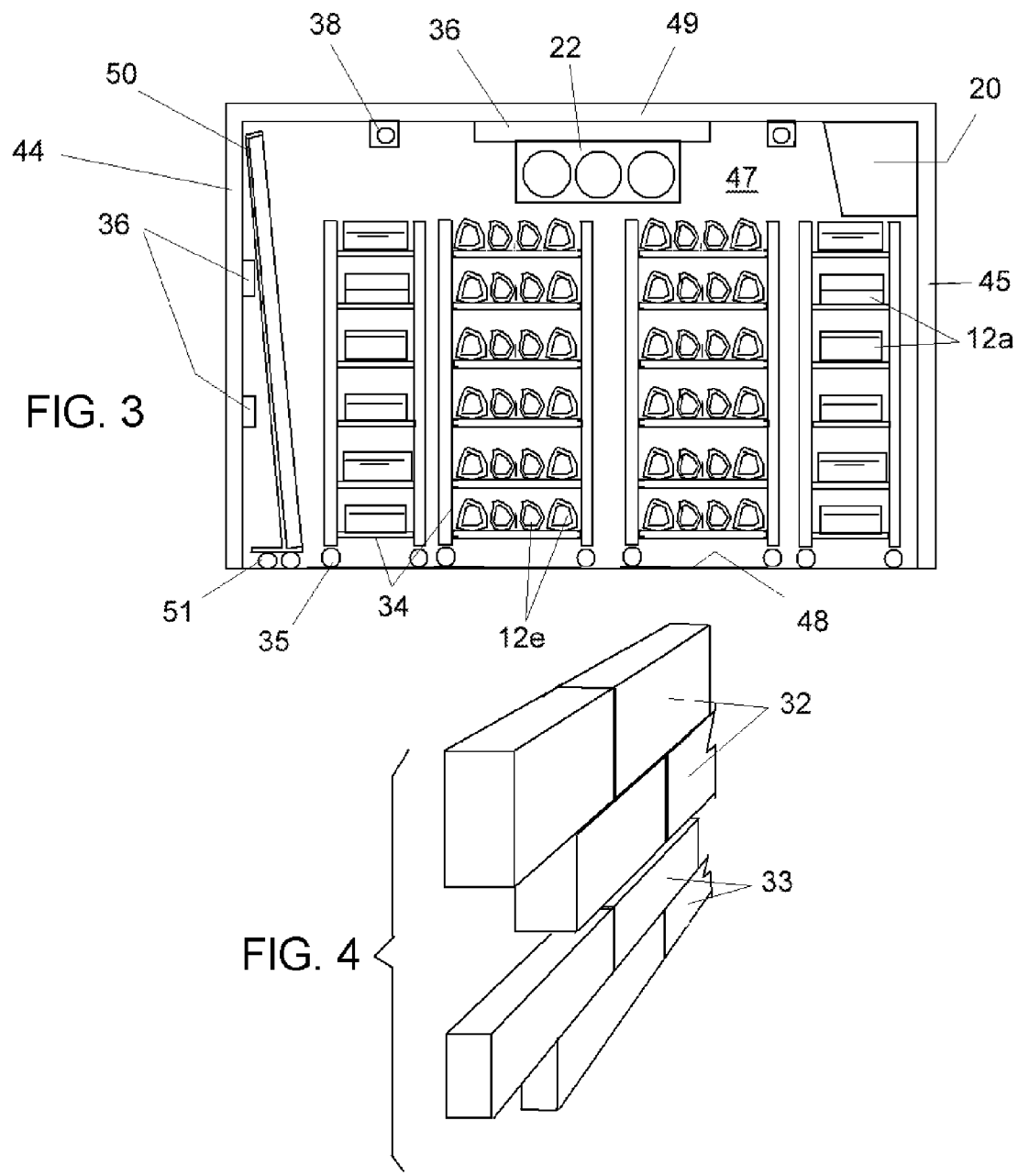

MEAT AGING PROCESS

FIELD AND BACKGROUND OF THE INVENTION

The present invention relates generally to the field of food preparation, and in particular to a new and useful process for aging meat that allows the meat to be aged for a longer period to enhance its tenderness and flavor, while avoiding excessive spoilage and waste.

The subject inventor, David Burke, is a renowned master chef and food innovator who has introduced various unique concepts to American cooking. A small sampling can be found at the inventor's website.

One of the inventor's techniques uses bricks of Himalayan salt in a climate-controlled aging room in his restaurant in Chicago, Ill., "David Burke's PrimeHouse," for dry-aging meats, in particular beef, for as long as 35 days. Aging breaks out enzymes in the meat and makes it more flavorful and tender. Unlike wet-aging, where the pieces of meat are sealed in a plastic wrapping and aged from the inside out in a short period of a few days at most, the far more expensive dry-aging process exposes the surface of the meat to the atmosphere in an aging room and aging occurs from the outside in. Dry-aging generally takes from two to four weeks but the tangy flavor is enhanced even further by aging for 35 days, if possible. Aging periods of longer than 35 days, however, have been considered to be impractical since a piece of meat aged for so long would be expected to be unusable.

The inventor's prior Chicago aging room utilizes a plastic rack that carries an ordered stack of bricks of Himalayan salt. Each brick has an average height of about 2 inches, an average width of about 4 inches, an average length of about 8 inches and an average weight of about 3.10 pounds. There are 153 bricks in the stack for an initial total weight of 474.3 pounds of salt in the room. The bricks are in an orderly arrangement of rows that are stacked row-upon-row in one layer of bricks on the plastic rack. The bricks in each row are off set to the side by one half a brick length with respect to the next row, in the same way that bricks are stacked in a conventional brick wall, but the bricks are not adhered to each other, but simply stay in place by gravity. Although eventually the bricks fuse together randomly due to moisture in the room, the stack of bricks is tilted back in its salt rack against the wall of the room to help prevent upsetting the stack of salt bricks, for example, while meat pieces are being loaded onto meat racks in the room, or unloaded from the meat racks after aging.

Other parameters of the inventor's prior Chicago process are listed later in this disclosure for better comparison to the parameters of the inventor's improved aging process that is disclosed and claimed here.

As dry aging progresses the outer surface of the meat becomes discolored and hard and must eventually be removed to expose the usable, flavorful core. Accordingly cost increases even further due both to the long time needed for the dry-aging process, and also due to the large amount of weight loss between the original piece of meat and the remaining usable cut that has lost moisture and also lost its outer hard covering.

A need remains for improving the dry-aging process even further, for allowing longer aging periods while minimizing weight loss as far as possible. The invention that is disclosed and claimed below, has been discovered as a result of experimentation and experience on the part of the inventor. Those with ordinary skill in the culinary arts would have no reasonable expectation of success or anticipate success by practicing the invention, from what is already known in the art, before reading this disclosure.

SUMMARY OF THE INVENTION

It is an object of the present invention to provide a process for dry aging meat that uses an enclosed, atmosphere controlled room with forced circulation, containing a stainless steel salt rack with a salt brick stack covering one wall. Each brick has a narrow width compared to its length for increased surface area and the salt rack is spaced from the wall for circulation around the bricks. A plurality of unwrapped and uncovered meat piece are loaded onto a meat rack in the room, spaced far from the salt rack and on a timed cycle of days that is a fraction of the total number of days for aging, the meat pieces are moved ever closer to the salt rack until finally, after the expiration of the total selected number of days for the dry aging, they are removed from the aging room for use.

A further object of the invention is to provide a process for dry aging meat for a selected number of days comprises providing an enclosed, temperature and humidity controlled aging room with forced air circulation that contains a meat aging atmosphere and a stainless steel salt rack carrying an ordered stack of a salt bricks, each salt brick in the stack having a narrow width compared to its length and the stack substantially covering one wall of the room for increased surface area of the stack in the aging atmosphere, the salt rack being space from the one wall of the room for allowing circulation of the atmosphere around the stack of bricks, loading a plurality of unwrapped and uncovered meat pieces onto a meat rack in the room that is spaced far from the salt rack, on a timed cycle of days that is a fraction of the total selected number of days for the dry aging, the meat pieces being moved to a closer location in the room to the salt rack, repeating the moving of the meat pieces after each cycle, closer to the stack of salt so that the meat pieces are moved from location to location ever closer to and then along the stack of salt bricks, and, after expiration of the total selected number of days for the dry aging process, removing the meat pieces from the aging room for use.

A still further object of the invention is to provide a process for aging meat for a selected number of days, comprising: providing an enclosed, temperature and humidity controlled aging room having a pair of spaced apart longer length walls each with a height, a pair of spaced apart shorter width walls each with the same height, a floor and a ceiling, for enclosing a volume for containing an aging atmosphere; controlling the temperature and the humidity of the aging atmosphere in the aging room to be within selected temperature and humidity ranges; providing along substantially all of the length and height of one of the length walls, a stainless steel salt rack carrying an ordered stack of a multiplicity of salt bricks, each salt brick in the stack having a narrow width compared to a length and a height of the brick for increased surface area of the stack in the aging atmosphere, the salt rack being space from the one length wall for allowing circulation of the atmosphere around the stack of bricks; and providing a plurality of meat racks in the aging room, spaces between the stack of bricks and the other one of the length walls, the meat racks being arranged around the aging room in a respective plurality of aging locations from remote locations spaced furthest from the salt rack, to intermediate locations that are closer to the salt rack, to proximal locations that are along the salt rack.

The process continues by forcibly circulating the atmosphere in the aging room around the meat racks and the salt racks; loading a first plurality of unwrapped and uncovered meat pieces to be dry aged, onto a meat rack at one of the remote locations; leaving the first plurality of meat pieces at the one remote location for a first time cycle corresponding to a fraction of the total selected number of days for the dry aging; after the passage of the first time cycle, moving the first plurality of meat pieces to one of the intermediate locations; leaving the first plurality of meat pieces at the one intermediate location for a second time cycle corresponding to a fraction of the total selected number of days for the dry aging; after the passage of the second time cycle, moving the first plurality of meat pieces to one of the proximal locations that are along the salt rack; leaving the first plurality of meat pieces at the one proximal location for a third time cycle corresponding to a fraction of the total selected number of days for the dry aging; and after the passage of the third time cycle, removing the first plurality of meat pieces from the aging room for use. The total of all of the time cycles are equal to the selected number of days of dry aging for the first plurality of meat pieces.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 is a side sectional view of the inventive aging room of FIG. 2; and

FIG. 4 is a comparative view of the average brick size and arrangement of the prior and the current inventive Himalayan salt brick stack.

DESCRIPTION OF THE PREFERRED EMBODIMENTS

Figure 1:
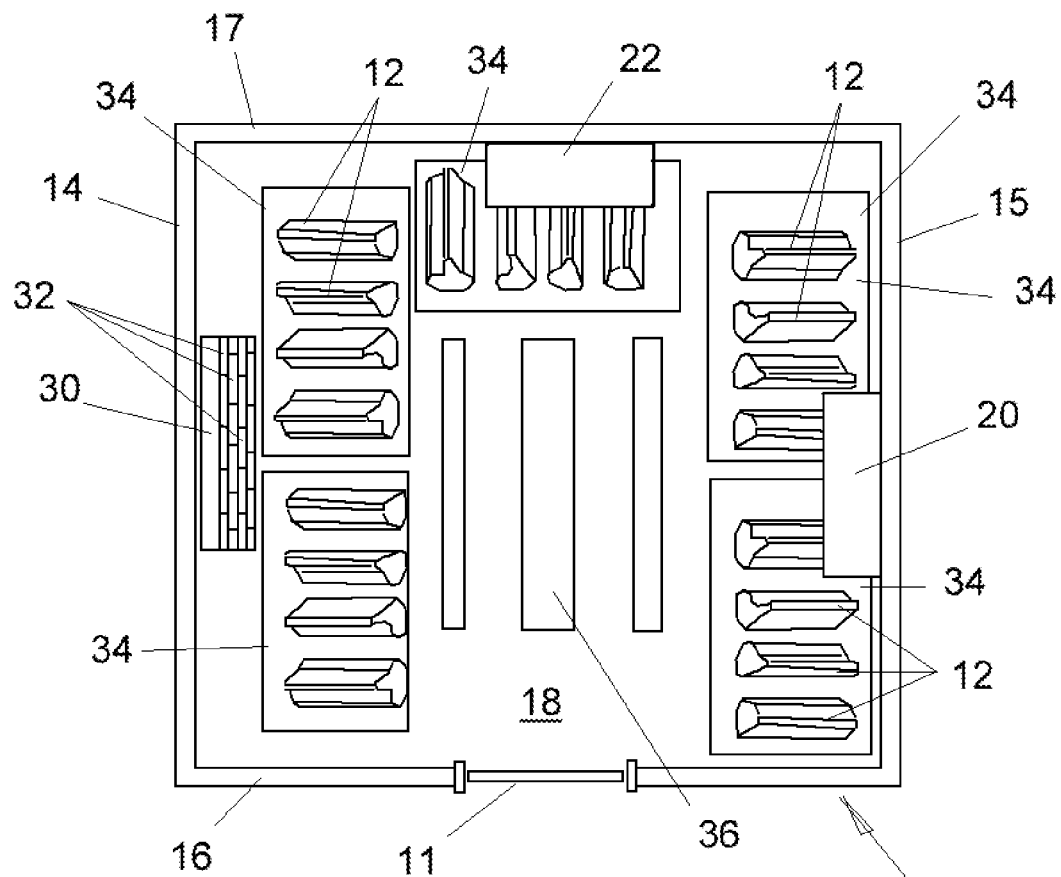
FIG. 1 is a schematic, top plan view of a prior art meat aging room developed by the inventor.

Referring now to the drawings, in which like reference numerals are used to refer to the same or similar elements, FIG. 1 schematically illustrates the prior Chicago process for dry aging meat pieces 12 in an aging room for a selected number of days and which utilizes an enclosed, temperature and humidity controlled aging room 10 having a pair of spaced apart and insulated side walls 14 and 15, a pair of spaced apart and insulated end walls 16 and 17, a floor 18 and a ceiling, for enclosing a volume for containing an aging atmosphere. The temperature and the humidity of the aging atmosphere in the aging room are controlled to be within selected temperature and humidity ranges by a refrigeration unit 20 and a humidifier 22 which also contains fans for forcibly circulating the atmosphere in the aging room around meat racks and a salt rack in the room volume.

Along part of the length and part of the height of one of the side walls 14, a plastic salt rack 30 is provided and carries an ordered stack of a multiplicity of salt bricks 32, each salt brick in the stack being preferably a brick of Himalayan salt.

A plurality of multi-shelved food grade meat racks 34 are arranged in the aging room 10 and are spaces between the stack of bricks on rack 30 near wall 14, and the other one of the side walls 15. To practice the prior process, the meat pieces 12 are weighed, tagged with the weight and date and loading through a door 11 in end wall 16, onto a meat rack 34 in the room 10 in an unwrapped and uncovered state so that the surface of the meat is exposed directly to the aging atmosphere. After the passage of a total selected number of days for the dry aging process, the aged pieces of meat are removing from the aging room. For their entire stay in the aging room 10, each meat piece 12 remains at the same location.

Other fixtures in the aging room are one or more fluorescent lights 36 on the ceiling and/or walls of the room 10 for ambient lighting during the day or during business hours, and one or more ultraviolet (UV) or black light (not shown in FIG. 1) on the walls and/or ceiling of the room that are turned on when the ambient lights 36 are turned off to help maintain a sanitary condition in room 10 by killing, or at least reducing microbes in the atmosphere.

Chicago Parameters
Salt-Room Dimensions (feet): 12 wide×16 long×8 high
Relative Humidity:
Range: 61%-85%
Temperature(° F.):
Range: 32-41
Preferred Range: 35-41
Aging Time (Days):
Range: 7-70
Preferred Range: 28-55
Air Circulation (Linear Feet Per Minute):
Range: 15-20 LFM
Preferred Range: 15-20 LFM
Salt-Brick Dimensions (Inches)
Average Height: 4
Average Width: 2
Average Length: 8
Brick Average Weight (lbs): 3.10
Number of Bricks in Rack: 153.

The salt rack in Chicago is plastic as mentioned above and the ratio of salt to meat in the aging room by weight is 1:4 of about 25% salt weight per weight of meat being aged. The individual pieces of meat which, for beef, are generally in the range of about 20 to 40 pound each initially, are not moved during the aging process in the prior Chicago method, but instead are placed on a selected meat rack 34 for the entire aging period.

After experimenting with various aspects of the Chicago aging room and process, and with his understanding of the various dynamics that take place during the dry-aging precess, the inventor has discovered that, unexpectedly to him and to others of ordinary culinary skill, the already long dry-aging period can be extended even further with slowed decay rates and enhanced flavor and tenderness.

Firstly the inventor has found that if the pieces of meat are rotated to different positions in the aging room, starting first on a meat rack furthest from the salt rack when the meat pieces are first weighed, dated and placed in the room, and then moved to meat racks that are progressively closer to the salt rack on a rotation cycle of, for example 5 days, that the aging process can be extended to 40 days or even 70 days, without excessive decay in or on the meat pieces, and with very discernable improvement in flavor and tenderness over the 35 day aged meats, or example of the Chicago process.

The inventor also discovered that replacing the plastic salt rack with a stainless steel salt rack for carrying the stack of Himalayan salt bricks, unexceptedly improved the flavor even further.

In addition, the inventor has found that by using a thinner stack of salt bricks and by using more weight of salt per weight of meat, the increased surface area exposed to the conditioned atmosphere in the aging room further extends the number of days the meat can be aged. He found that by reducing the average brick width from 2 inches to 1 or 1.5 inches, and by considerably increasing the weight of salt bricks in the room to a salt-to-meat weight ratio of above about 1:3 or preferably about 1:2, that is, about 50% salt weight per weight of meat being aged, the resulting aging time and flavor results are improved further. A preferred range is about 40% to about 60% salt weight to meat weight in the room, by weight.

To further advance the exposure of the meat to the salt laidened atmosphere, especially during the latter period of the total aging process when the meat pieces are closest to the salt stack during successive rotation cycles, the inventor found it most advantageous to extend the stack of salt bricks along substantially all of one of the longer walls of the aging room, and substantially from the floor to the ceiling of the wall.

The inventor believes that by increasing the overall salt content of the aging room atmosphere by providing more salt, and by exposing the meat to a lower level of salt during the early days of aging, when spoilage is less likely to occur, but then increasing this exposure during the latter days when the likelihood of spoilage as increased, by moving the meat piece along the salt covered wall, maximum aging and flavor building occurs with minimum spoilage.

Following are the preferred parameters for the process of the present invention that the inventor has researched and perfected at his restaurant "David Burke Prime" at Foxwoods Resort Casino in Connecticut, all within twelve month of the filing date this patent application.

Foxwoods Parameters
Salt-Room Dimensions (feet): 10 wide×18 long×8 high
Relative Humidity:
Allowable Range: 61%-85%
Preferred Range: 61%-67%
Temperature(° F.):
Allowed Range: 32-41
Preferred Range: 32-39
Aging Time (Days):
Range: 7-70
Preferred Range: 28-55
Air Circulation (Linear Feet Per Minute):
Range: 15-20 LFM
Preferred Range: 15-20 LFM
Salt-Brick Dimensions (Inches)
Average Height: 2 (preferred 1.5-4.5)
Average Width: 1.5 (preferred 1-2)
Average Length: 8 (preferred 4-9)
Brick Average Weight (lbs): 1.63 (1.5 to 2.0)
Number of Bricks in Rack: 500 to over 1000.

While most widely usable for aging beef, the principles of the dry-aging process can be applied to other meats such as lamb, pork, bison, game animals like deer and elk, or other edible meats.

Figure 2:
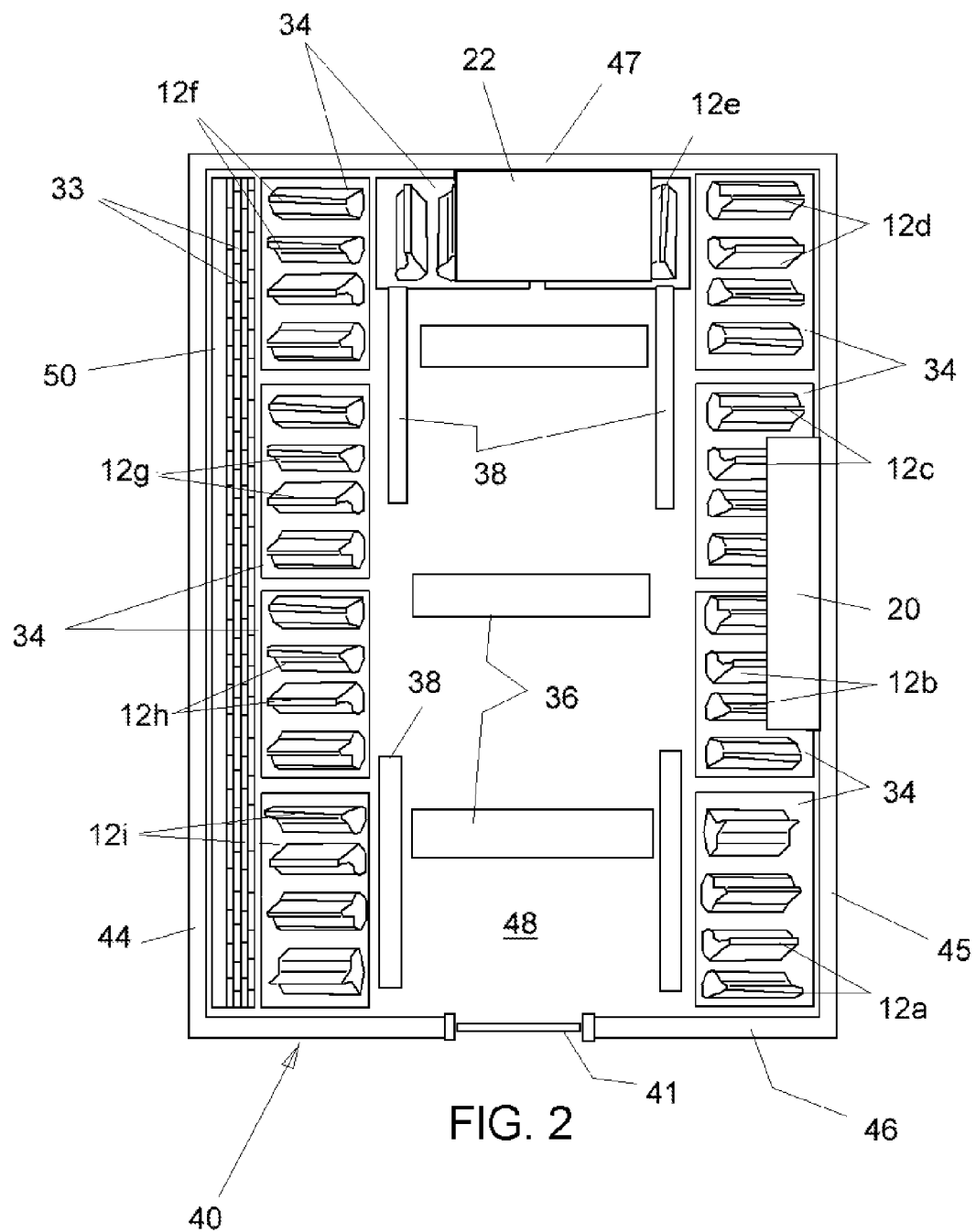
FIG. 2 is a view similar to FIG. 1 but of the aging room of the present invention.

Turning to FIGS. 2 and 3, these figures schematically illustrate the process developed at Foxwoods and embodying the current invention for dry aging multiple pluralities of unwrapped and uncovered meat pieces 12a to 12i, in an aging room 40 for a selected number of days, and which utilizes an enhanced and enclosed, temperature and humidity controlled aging atmosphere.

Room 40 has a pair of spaced apart and insulated longer length walls 44 and 45, of about 18 feet for example, each with a height of about 8 feet for example, a pair of spaced apart and insulated shorter width walls 46 and 47, of about 10 feet for example, each with the same height, a floor 48 and a ceiling 49, for enclosing a volume for containing the aging atmosphere. The temperature and the humidity of the aging atmosphere in the aging room are controlled to be within selected temperature and humidity ranges by a refrigeration unit 20 and a humidifier 22 which also contains fans for forcibly circulating the atmosphere in the aging room 40, around meat racks and the salt rack in the room volume.

Along substantially all of the length and height of one of the length walls 44, a stainless steel salt rack 50 is provided for carrying an ordered stack of a multiplicity of salt bricks 33. Each salt brick 33 in the stack has a narrow width, of preferred 1 to 2 inches, compared to its length of about 4 to 9 inches and its height of about 2-5 inches. Each brick has an average weight of about 1.5 to 2.0 pounds and there are about 500 to over 1000 bricks in the salt rack 50. As best shown in FIG. 3, the salt rack 50 carries the bricks 33 in a tilted back manner toward the wall 44, from the bottom to the top of the wall, and is spaced from the wall 44 by about 1 foot at the bottom and less at the top for allowing circulation of the atmosphere around the stack of bricks. The inventor has found that the stainless steel salt rack 50 adds no flavor to the meat as other materials might, and has placed the salt rack on rollers 51 so that the entire rack can be moved in the room and removed from the room for loading and unloaded of the brick which, over time in the room, slowly resolve into the aging atmosphere and must eventually be replaced.

A plurality of multi-shelved, food grade meat racks 34 are arranged in the aging room 40, and are spaces between the stack of bricks 50 and the other one of the length walls 45. Meat racks 34 are on rollers 35 so that they can be moved into and out of the room for loading, unloading and cleaning, and so that they can be moved to various locations in the room as will be explained below. The meat racks 34 are arranged around the aging room 40 at a respective plurality of aging locations from a remote location for meat pieces 12a to the right of the door 41 in FIG. 2, that is spaced furthest from the salt rack 50, to intermediate locations for meat pieces 12e along the far short width wall 47, that are progressively closer to the salt rack, to proximal locations for meat pieces 12f to 12i that are along the salt rack 50.

According to the method of the invention, a first plurality of unwrapped and uncovered meat pieces 12a to be dry aged, are weighed, and tagged with the weight and date and then loaded onto the meat rack 34 at the most remote location from the salt rack 50, and nearest the door 41. This first plurality of meat pieces 12a is them left at this remote location for a first time cycle corresponding to a fraction of the total selected number of days for the dry aging, for example, for 5 of the 40 day total that is contemplated of the meat pieces 12a.

After the passage of the first time cycle of e.g. 5 days, the meat pieces 12a are moved either to a next meat rack 34 at 12b, along wall 45 that can also be considered to be an intermediate location, or to the location 12e long the far wall 47 and left there for the next 5 day time cycle, again corresponding to a fraction of the total number of days for the dry aging process. After the passage of this second time cycle, the meat pieces are gain moved, e.g. to one of the proximal locations 12f that are along the salt rack 50. They are left there for a third time cycle corresponding to a fraction of the total selected number of days for dry aging and, after the passage of the third time cycle, removed from the aging room through door 41 of use.

As each of the plurality of meat pieces is moved from location to location, ever closer, or at least not further from the rack 50, and then along the rack, a new plurality of meat pieces replaces them so that a continuous rotation of sets of the meat pieces progress into the room, move along the walls from remote to proximal, and then move out of the room on a cyclic basis, after the total number of days have elapsed. Movement of the multiple pluralities of meat pieces can be achieved by moving the pieces from meat rack to meat rack, or by rolling an entire meat rack 34 with the selected plurality of meat pieces to the next aging location around the walls of aging room 40.

As in the Chicago process, other fixtures in the aging room are one or more fluorescent lights 36 on the ceiling and/or walls of the room 10 for ambient lighting during the day or during business hours, and one or more ultraviolet (UV) or black lights 38 on the walls and/or ceiling of the room that are turned on when the ambient lights 36 are turned off to help maintain a sanitary condition in room 10 by killing or at least reducing microbes in the atmosphere. Especially attractive for the appearance of the aging room are florescent lights 36 on the length wall 44, behind salt rack 50, that illuminate the stack of translucent pink or Salmon colored Himalayan bricks 33 from behind. The interior of the aging room 40 is visible from outside through windows (not shown) so that patrons of the restaurant can see the dry aging process in operation.

FIG. 4 compares the relatively thicker prior bricks 32 in the ordered stack of the Chicago salt rack at the top, to the relatively narrower and generally small bricks 33 of the present invention.

The longer the duration of time that the meat remains in the salt aging box, the salt adds further seasoning and begins to permeate the flavor of the meat. According to the present invention, the aging period can be extended more reliably and with more likelihood that the aged piece of meat will still be usable at the end of the period. While sporadically a piece of meat aged for the longer range of days up to 70 days was still usable and enhanced in its properties according to the prior technique, according to the present invention 70 day aged meat is far more often in this category of usable and enhanced meat.

While a specific embodiment of the invention has been shown and described in detail to illustrate the application of the principles of the invention, it will be understood that the invention may be embodied otherwise without departing from such principles.

What is claimed is:

1. A process for dry aging meat for a selected number of days, comprising:
    providing an enclosed, temperature and humidity controlled aging room having a pair of spaced apart longer length walls each with a height, a pair of spaced apart shorter width walls each with the same height, a floor and a ceiling, for enclosing a volume for containing an aging atmosphere;
    controlling the temperature and the humidity of the aging atmosphere in the aging room to be within selected temperature and humidity ranges;
    providing along substantially all of the length and height of one of the length walls, a stainless steel salt rack carrying an ordered stack of a multiplicity of salt bricks, each salt brick in the stack having a smaller width compared to a length and a height of the brick for increased surface area of the stack in the aging atmosphere, the salt rack being space from the one length wall for allowing circulation of the atmosphere around the stack of bricks;
    providing a plurality of meat racks in the aging room, spaces between the stack of bricks and the other one of the length walls, the meat racks being arranged around the aging room in a respective plurality of aging locations from remote locations spaced furthest from the salt rack, to intermediate locations that are closer to the salt rack, to proximal locations that are along the salt rack;
    forcibly circulating the atmosphere in the aging room around the meat racks and the salt racks;
    loading a first plurality of unwrapped and uncovered meat pieces to be dry aged, onto a meat rack at one of the remote locations;
    leaving the first plurality of meat pieces at the one remote location for a first time cycle corresponding to a fraction of the total selected number of days for the dry aging;
    after the passage of the first time cycle, moving the first plurality of meat pieces to one of the intermediate locations;
    leaving the first plurality of meat pieces at the one intermediate location for a second time cycle corresponding to a fraction of the total selected number of days for the dry aging;
    after the passage of the second time cycle, moving the first plurality of meat pieces to one of the proximal locations that are along the salt rack;
    leaving the first plurality of meat pieces at the one proximal location for a third time cycle corresponding to a fraction of the total selected number of days for the dry aging; and
    after the passage of the third time cycle, removing the first plurality of meat pieces from the aging room;
    the total of all of the time cycles equaling the selected number of days of dry aging for the first plurality of meat pieces.

2. The process of claim 1, including, after the passage of the first time cycle, loading a second plurality of unwrapped and uncovered meat pieces to be dry aged onto the mat rack from which the first plurality of meat pieces were moved, the second plurality of meat pieces being moved during each following time cycle to the location from which the first plurality of the meat pieces was moved.

3. The process of claim 1, wherein there are a plurality remote, intermediate and proximal locations, the first, second and third time cycles each being further divided into at least two sub-cycles and the first plurality of meat pieces being moved sequentially from location to location upon the passage of each sub-cycle with each move bring the first plurality of meat pieces either closer to or to the same distance from the salt rack from the previous sub-cycle.

4. The process of claim 1, wherein there are a plurality remote, intermediate and proximal locations, the first, second and third time cycles each being further divided into at least two sub-cycles and the first plurality of meat pieces being moved sequentially from location to location upon the passage of each sub-cycle with each move bring the first plurality of meat pieces either closer to or to the same distance from the salt rack from the previous sub-cycle, each sub-cycle being from 2 to 8 days long.

5. The process of claim 1, including providing on the salt rack an amount of about 40% to about 60% salt weight to meat weight in the aging room.

6. The process of claim 1, including controlling the humidity in the aging room to be about 61% to 67%, controlling the temperature in the aging room to be about 32 to 39° F., and circulating the atmosphere in the aging room at a rate of about 15 to 20 linear feet per minute.

7. The process of claim 1, including illuminating the meat pieces in the aging room for at least part of selected number of days for the dry aging with ultraviolet radiation, controlling the humidity in the aging room to be about 61% to 85%, controlling the temperature in the aging room to be about 32 to 41° F., and circulating the atmosphere in the aging room at a rate of about 15 to 20 linear feet per minute.

8. A process for dry aging meat for a selected number of days comprising:
an enclosed, temperature and humidity controlled aging room with forced air circulation that contains a meat aging atmosphere;
providing in the room a stainless steel salt rack carrying an ordered stack of salt bricks, each salt brick in the stack having a smaller width compared to its length and the stack substantially covering one wall of the room for increased surface area of the stack in the aging atmosphere;
spacing the salt rack from the one wall of the room for allowing circulation of the atmosphere around the stack of bricks;
loading a plurality of unwrapped and uncovered meat pieces onto a meat rack in the room that is spaced far from the salt rack;
A plurality of a timed cycle of days that is a fraction of the total selected number of days for the dry aging, each cycle comprising moving the meat pieces to a closer location in the room to the salt rack;
repeating the moving of the meat pieces after each cycle, closer to the stack of salt so that the meat pieces are moved to intermediate locations that are closer to the salt rack, and then to proximal locations that are along the salt rack; and
after expiration of the total selected number of days for the dry aging, removing the meat pieces from the aging room.

9. The process of claim 8, including placing a further plurality of meat pieces at each location after the first-mention plurality of meat pieces has been moved for continuously aging multiple pluralities of meat pieces in rotation in the room.

10. The process of claim 8, including providing on the salt rack, an amount of about 40% to about 60% salt weight to meat weight in the room.

11. The process of claim 8, including controlling the humidity in the aging room to be about 61% to 67%, controlling the temperature in the aging room to be about 32 to 39° F., and circulating the atmosphere in the aging room at a rate of about 15 to 20 linear feet per minute.

12. The process of claim 8, including illuminating the meat pieces in the aging room for at least part of selected number of days for the dry aging with ultraviolet radiation, controlling the humidity in the aging room to be about 61% to 85%, controlling the temperature in the aging room to be about 32 to 41° F., and circulating the atmosphere in the aging room at a rate of about 15 to 20 linear feet per minute.

13. A process for dry aging meat that uses an enclosed, atmosphere controlled room with forced circulation, comprising:
providing a stainless steel salt rack with a salt brick stack covering one wall of the room, each brick having a smaller width compared to its length for increased surface area and the salt rack;
spacing the salt rack from the one wall for circulation around the bricks;
loading a plurality of unwrapped and uncovered meat piece onto a meat rack in the room that is spaced a first distance from the salt rack;
A plurality of timed cycles of days that are a fraction of a total selected number of days for the dry aging, each cycle comprising moving the meat pieces to a closer location in the room to the salt rack;
repeating the moving of the meat pieces after each cycle, closer to the stack of salt so that the meat pieces are moved to intermediate locations that are closer to the salt rack, and then to proximal locations that are along the salt rack; and
after the expiration of the total selected number of days for the dry aging, removing the meat pieces form the aging room for use.

14. The process of claim 13, including replacing the first-mentioned plurality of meat pieces with a further plurality of meat pieces at each location after the first-mention plurality of meat pieces has been moved for continuously aging multiple pluralities of meat pieces in rotation in the room.

15. The process of claim 13, including providing on the salt rack, an amount of about 40% 1 to about 60% salt weight to meat weight in the room.

16. The process of claim 13, including controlling the humidity in the aging room to be about 61% to 67%, controlling the temperature in the aging room to be about 32 to 39° F., and circulating the atmosphere in the aging room at a rate of about 15 to 20 linear feet per minute.

17. The process of claim 13, including illuminating the meat pieces in the aging room for at least part of selected number of days for the dry aging with ultraviolet radiation, controlling the humidity in the aging room to be about 61% to 85%, controlling the temperature in the aging room to be about 32 to 41° F., and circulating the atmosphere in the aging room at a rate of about 15 to 20 linear feet per minute.

\* \* \* \* \*